Jan. 13, 1931.　　　A. WASBERG ET AL　　　1,788,416
BEARING FOR CAR DOORS
Filed Dec. 5, 1927　　　3 Sheets-Sheet 1
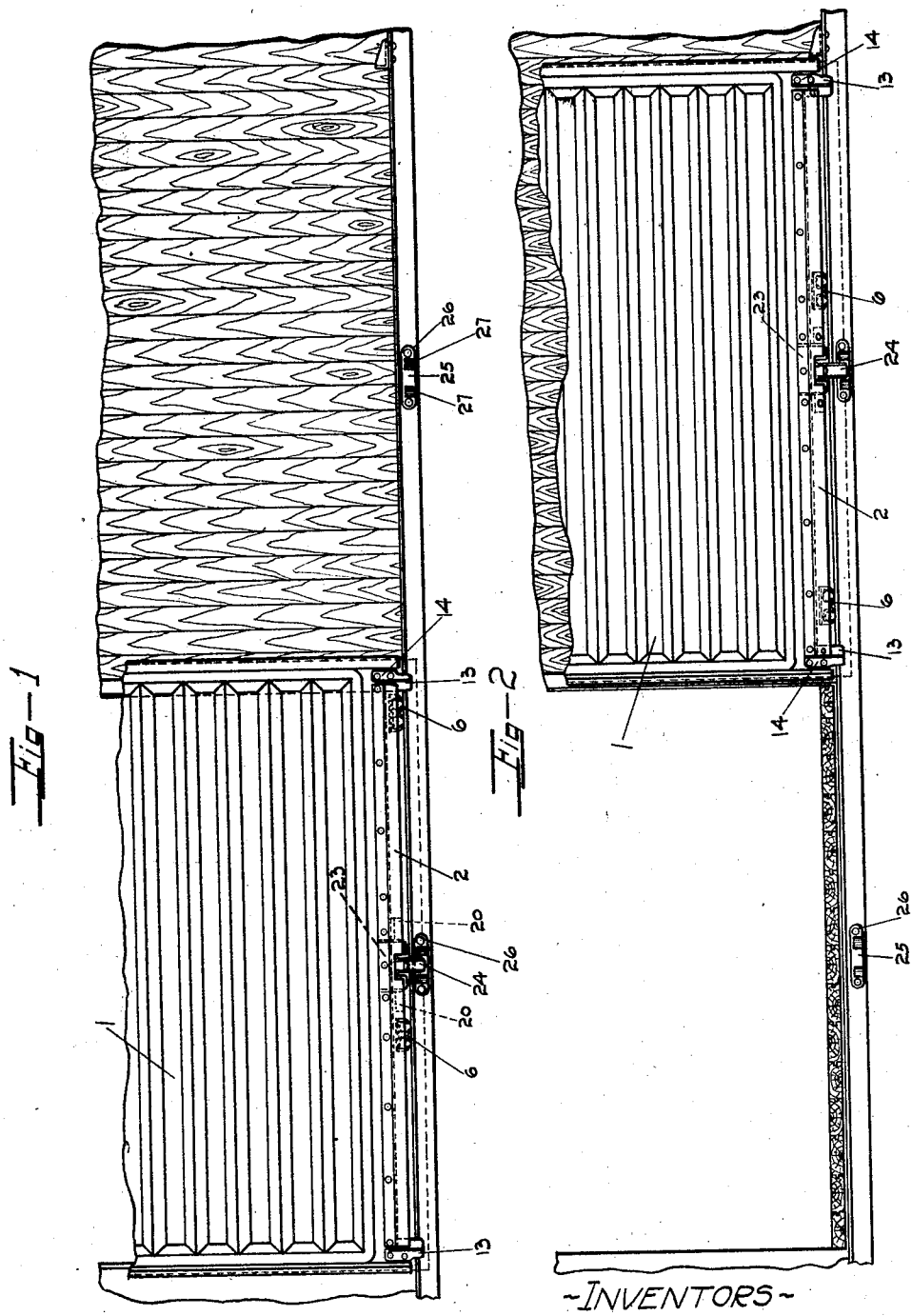
-INVENTORS-
AXEL WASBERG
KENNETH J. TOBIN Jan. 13, 1931.  A. WASBERG ET AL  1,788,416
BEARING FOR CAR DOORS
Filed Dec. 5, 1927  3 Sheets-Sheet 2
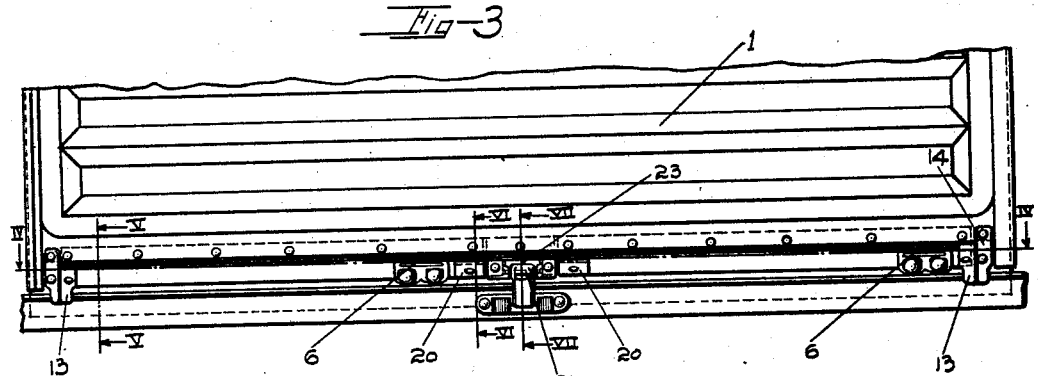
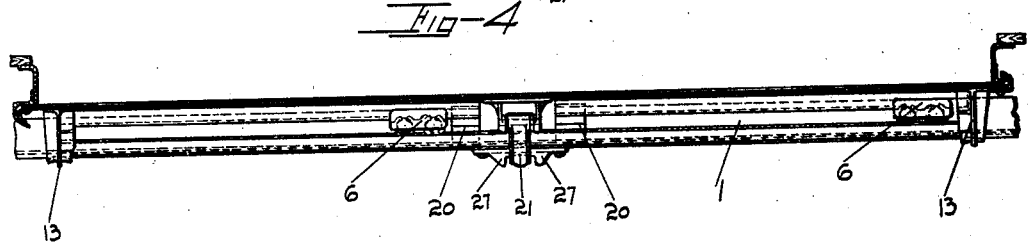
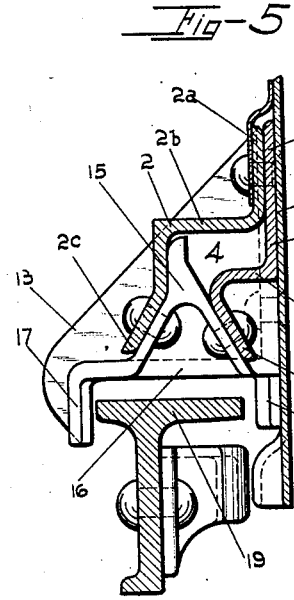 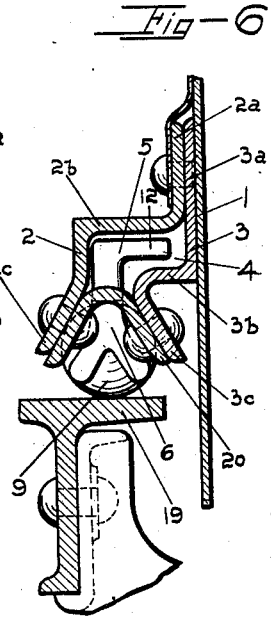 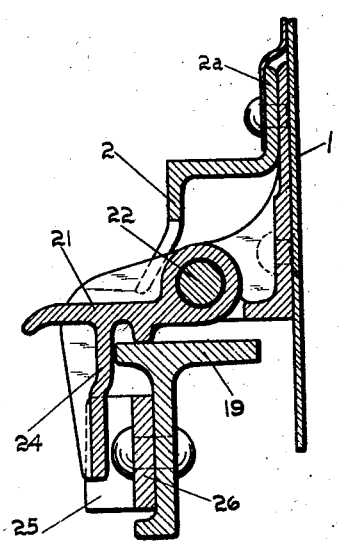
INVENTORS
AXEL WASBERG
KENNETH J. TOBIN
ATTYS

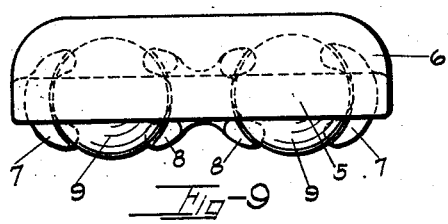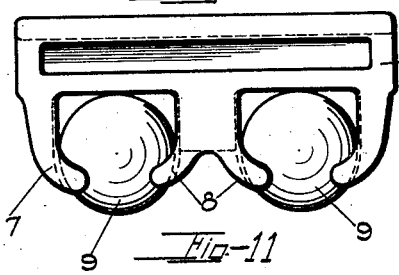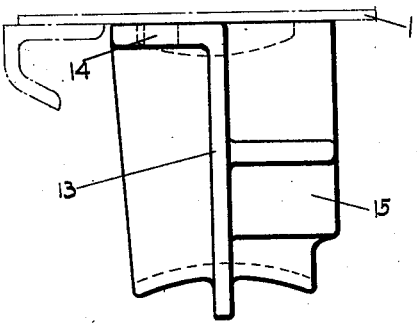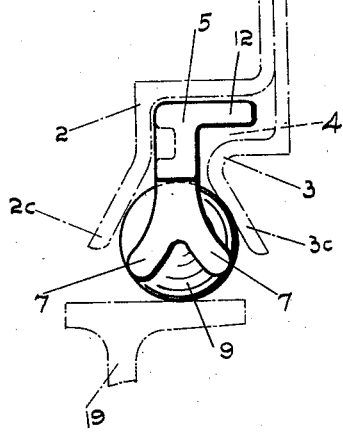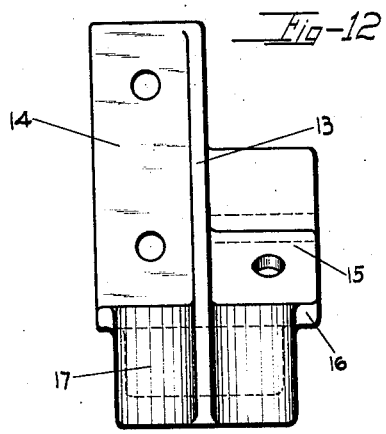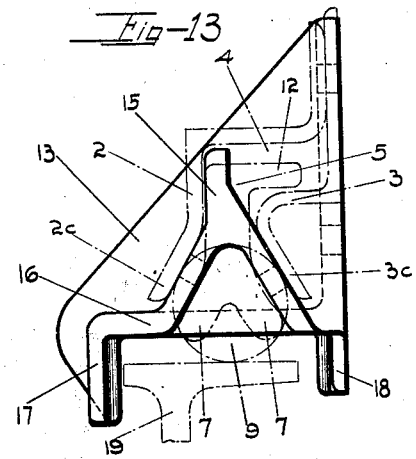

Patented Jan. 13, 1931

1,788,416

UNITED STATES PATENT OFFICE

AXEL WASBERG AND KENNETH J. TOBIN, OF CHICAGO, ILLINOIS, ASSIGNORS TO CAMEL COMPANY, OF CHICAGO, ILLINOIS, A CORPORATION OF ILLINOIS

BEARING FOR CAR DOORS

Application filed December 5, 1927. Serial No. 237,786.

This invention relates to a car door, and concerns itself primarily with bearing means for the door and means for controlling the same against accidental sliding movements.

It is among the objects of this invention to provide a unitary structure in which the door and the bearings are shipped in assembled relation and ready for application to the car. It is also an object of this invention to provide a structure in which the door is always balanced upon its bearings with provision for preventing accidental sliding movements, and for controlling the relative movements of the door and bearings.

With these and other objects in view which will become more apparent in the following description and disclosures, this invention comprises the novel structure and combination of parts hereinafter described and more particularly pointed out and defined in the appended claims.

In the accompanying drawings, which illustrate a preferred embodiment of this invention and in which similar reference numerals refer to similar features in the different views:

Figure 1 is a fragmentary side elevational view of a house car having a sliding door involving this invention and showing the door in closed position;

Figure 2 is a view similar to Figure 1 showing the door in open position;

Figure 3 is an enlarged fragmentary elevational view of the lower part of the door and the supporting track;

Figure 4 is an enlarged sectional view taken upon the line IV—IV of Figure 3;

Figure 5 is an enlarged sectional view taken upon the line V—V of Figure 3 looking in the direction of the arrows;

Figure 6 is an enlarged sectional view taken upon the line VI—VI of Figure 3 and looking in the direction of the arrows;

Figure 7 is an enlarged sectional view taken upon the line VII—VII of Figure 3 looking in the direction of the arrows;

Figure 8 is an enlarged top plan view of the carrier member;

Figure 9 is a side elevational view of the carrier member;

Figure 10 is an end elevational view of the carrier member showing its retaining and slidable connection with the door;

Figure 11 is an enlarged top plan view of the retaining castings at the lower ends of the door;

Figure 12 is an enlarged side elevational view of the casting, and

Figure 13 is an enlarged end elevational view of the casting.

In the drawings, there is shown a car door 1 which may consist of metal or wood of any approved construction. Along one margin of the door, in the present instance along the lower margin, there extends a pair of spaced coacting members 2 and 3 of angular formation. The member 3 has a vertical portion $3^a$ which is attached to the door, a short horizontal portion $3^b$ which terminates in an arcuate bend having an outwardly flaring wall $3^c$. The member 2 is provided with a vertical attaching portion $2^a$ attached to the door in superposed relation with the attaching portion $3^a$, and a horizontally extending portion $2^b$ terminating in a downwardly directed flange having an outwardly flaring wall $2^c$. These flaring or divergent walls $2^c$ and $3^c$ form a V-shaped track upon the lower margin of the door, and the space 4 between these coacting members forms a guideway for receiving the extension 5 of a carrier element 6.

The carrier element 6 is best shown in Figures 8 to 10, and in referring to said figures it will be noted that the same comprises end prongs 7 and intermediate prongs 8, with rolling elements 9 rotatably retained between the prongs 7 and 8. The aforementioned extension 5 which extends into the guideway 4 through a restricted throat just above the track has a horizontally directed head slidably interlocked in said guideway, since this horizontally directed head 12 normally lies between the horizontal portions $2^b$ and $3^b$ of the track members 2 and 3 and prevents the carrier from accidentally dropping out at any time. The head 12, however, travels freely in the guideway and does not interfere with the rollers contacting the diverging track.

The track formed by the diverging walls 2° and 3° is closed at its ends by end castings or members 13 (Figures 11–13) which prevent spreading of the tracks and also retain the rollers. Each end casting is provided with an attaching flange 14 that is secured to the door at the end of the track. From one side of the casting there projects a V-shaped lug 15 that fits between the track members 2 and 3 and is secured thereto as shown in Figure 5. The casting is also provided with a base portion 16 best shown in Figure 13, and this base portion has depending guide portions 17 and 18 that extend upon opposite sides of the supporting track 19 for the door.

Adjacent the center line of the door are a pair of V-shaped clips 20 best shown in Figure 6 which fit between the track members 2 and 3 to which they are secured. It will be noted that the carriers 6 are located upon opposite sides of the two clips 20 with the result that relative longitudinal movement between each carrier and the door is confined to the distance between the end casting 13 and a clip 20 which is slightly less than one-half the width of the door. It also will be appreciated that the end castings and intermediate clips 20 prevent spreading of the track members 2 and 3, the divergence of which may be properly adjusted in the first instance to provide the desired relative movement of the door and rolling elements.

A door that is mounted upon anti-friction rollers will accidentally slide through shunting or the like and is likely to ride off the track or distort and break the end members. For this reason, it is desirable to provide means for automatically locking the door in its open or closed position against such accidental movement. To this end, a locking detent 21 best shown in Figure 7 is pivoted upon a horizontal pivot 22 carried by a suitable casting 23 secured to the door substantially at the center line thereof, although the same may be placed at any convenient position. The detent 21 is provided with a depending locking portion 24 adapted to swing into a recess 25 formed in the edge of a casting 26. It will be noted that the recess 25 is formed between two projections having outer bevelled surfaces, as indicated at 27, with the result that as the door is moved along the track, the detent 21 upon encountering a casting 23 will ride outwardly upon the bevelled surface and automatically drop into the locking recess by gravity and lock the door against accidental sliding movement. The detent is adapted to be manually lifted out of the recess when it is desired to move the door. In the present instance, we have shown two castings 23 so located that the door may be locked against accidental movement in either its open or closed position.

Referring now to Figure 10 it will be noted that the diverging track members 2 and 3 on the door contact with the rolling elements upon points of a chord which is less than a diameter. This results in reducing the relative longitudinal movement between the door and the rollers. In the present instance, the door travels about one and a half times as fast as the rollers, but this rate may be varied by changing the divergence of the track members 2 and 3. By properly reducing the relative movement between the door and rollers, the travel of the rollers may be so limited as to avoid abutting the clips 20 and causing a braking and retarding action through sliding on the track. It will be noted, with reference to Figures 1 and 3, that when the door is closed, the rollers on the left are spaced a short distance from the clip 20 while the rear or right hand rollers are spaced a short distance from the end closure, showing that the relative movement of the door and rollers is not great enough to bring the rollers into contact with either the end castings or the intermediate clips 20. Likewise when the door is open, as shown in Figure 2, the rollers are a short distance from the aforementioned parts. It should also be noted that the relative movement between the door and rollers is not sufficient to cause an overbalance of the door, so that the door is always supported upon each side of its center.

It will be understood that the roller carriers 6 on account of their enlarged heads 12 in the guideway are retained from falling out, so that the roller bearings and doors may be shipped and handled as a unit. The end closures and the intermediate clips also retain the carriers during operation and provide a separate passage for each in the guideway.

We are aware that many changes may be made, and numerous details of construction may be varied through a wide range without departing from the principles of this invention, and we, therefore, do not purpose limiting the patent granted hereon, otherwise than necessitated by the prior art.

We claim as our invention:

1. The combination with a car door, of means providing a guideway at one margin of the door, a carrier having means overlapping a portion of said guideway and slidably interlocked in said guideway, and an anti-friction means rotatably mounted in said carrier.

2. In a car door, spaced coacting members at one margin of the door providing a guideway and a track, a pair of carriers, each having an L-shaped extension extending into said guideway, said extension and members having relatively slidably interengaging parts, and rolling elements rotatably mounted in said carriers for engaging said track.

3. In a car door, a pair of spaced angular members secured to one margin of the door for providing a guideway therebetween, the margins of said members flaring outwardly to provide a V-shaped track, a pair of spaced carriers each having an extension projecting into said guideway, said extensions having heads slidably retained in said guideway, and an anti-friction element rotatably supported in each carrier for engaging said track.

4. In a car door, a pair of spaced coacting members secured to one margin of the door providing a guideway therebetween with a restricted throat, the margins of said members flaring outwardly to provide a track below said throat, a carrier having an extension projecting into said guideway and having means within said guideway for slidably retaining the same, and an anti-friction element rotatably supported in said carrier for contacting with said track.

5. In a car door, a pair of spaced coating members secured to one margin of the door and having a guideway therebetween, a carrier having an extension projecting into said guideway and having means within said guideway overlapping said guideway for retaining the carrier, and an anti-friction element supported by the carrier.

6. In a car door, a pair of spaced coacting members having diverging walls forming a track, with a guideway above said track, a carrier having an extension projecting into said guideway, said extension having means slidably interlocked in said guideway, and an anti-friction element in said carrier having rolling engagement with said diverging walls.

7. In a car door, a pair of spaced co-operating members secured to one margin of the door and having diverging walls forming a track, and a guideway above said track, a roller carrier having an enlarged head slidably retained in said guideway, and enclosures for said track having means extending between said diverging walls for bracing said track and retaining said carrier.

8. In a door, a pair of spaced co-operating members secured to one margin of the door and having diverging walls forming V-shaped track, and a guideway above said tracks, means dividing said guideway into two parts, and a roller carrier having an L shaped extension slidably retained in each part of said guideway.

9. In a door of the character described, a pair of spaced cooperating members secured to one margin of the door and deformed to provide a guideway and a V-shaped track beyond said guideway, end closures for said guideway and means intermediate said guideway dividing the same into two parts, and an anti-friction element in each part engaging said track and a retainer for each anti-friction element having a flanged portion slidable in said guideway.

10. The combination with a car door, of means providing a guideway at one margin of the door, a carrier having means overlapping a portion of said guideway and slidably interlocked therein, an anti-friction means rotatably mounted in said carrier, a track for supporting said door, said anti-friction means contacting with the means providing the guideway at points lying on a circle less than a great circle and said anti-friction means contacting with the track on a point lying on a circle of greater diameter than the first mentioned circle.

In testimony whereof, we have hereunto subscribed our names at Chicago, Cook County, Illinois.

AXEL WASBERG.
KENNETH J. TOBIN.